(12) United States Patent
Sugino et al.

(10) Patent No.: US 7,344,471 B2
(45) Date of Patent: Mar. 18, 2008

(54) AUTOMATIC TRANSMISSION

(75) Inventors: Soichi Sugino, Saitama (JP); Tsukasa Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 10/556,598

(22) PCT Filed: Apr. 15, 2004

(86) PCT No.: PCT/JP2004/005390

§ 371 (c)(1),
(2), (4) Date: Nov. 14, 2005

(87) PCT Pub. No.: WO2004/104444

PCT Pub. Date: Dec. 2, 2004

(65) Prior Publication Data
US 2007/0010371 A1     Jan. 11, 2007

(30) Foreign Application Priority Data
May 19, 2003   (JP)   ............................ 2003-140260

(51) Int. Cl.
F16H 3/44 (2006.01)
(52) U.S. Cl. .................. 475/318; 475/320; 475/323
(58) Field of Classification Search ............... 475/317, 475/318, 320–324
See application file for complete search history.

(56) References Cited
U.S. PATENT DOCUMENTS

| 2,812,670 | A | * | 11/1957 | Winther | ................. | 74/720 |
|---|---|---|---|---|---|---|
| 2,865,232 | A | * | 12/1958 | Nardone | ................. | 475/156 |
| 6,685,595 | B2 | * | 2/2004 | Ohkubo et al. | ............. | 475/319 |
| 6,860,832 | B2 | * | 3/2005 | Hoher | ................. | 475/317 |
| 6,893,373 | B2 | * | 5/2005 | Kawamoto et al. | ......... | 475/302 |

FOREIGN PATENT DOCUMENTS

| JP | 60-4651 | 1/1985 |
|---|---|---|
| JP | 62-266253 | 11/1987 |
| JP | 4-46246 | 2/1992 |
| JP | 4-73445 | 3/1992 |
| JP | 5-172200 | 7/1993 |
| JP | 6-221389 | 8/1994 |
| JP | 8-210445 | 8/1996 |
| JP | 2000-304107 | 11/2000 |
| JP | 2002-504979 | 2/2002 |
| WO | WO98/57072 | 12/1998 |

* cited by examiner

Primary Examiner—Ha D. Ho
(74) Attorney, Agent, or Firm—Westerman, Hattori, Daniels & Adrian, LLP.

(57) ABSTRACT

An automatic transmission comprises a planetary gear train (PG) including a sun gear (S) connected to a first main shaft (3), a carrier (C) and a ring gear (R); a first gear train (G1) including a first drive gear (6) connected to the ring gear (R), and a first driven gear (7) disposed rotatably over a countershaft (5) and meshed with the first drive gear (6); a third gear train (G3) including a third drive gear (10) disposed rotatably with respect to the carrier (C), and a third driven gear (11) connected to the countershaft (5) and meshed with the third drive gear (10); a first brake (B1) for holding the ring gear (R) stationary, a first clutch (C1) for engaging/disengaging the first driven gear (7) to/from the countershaft (5); a third clutch (C3) for engaging/disengaging the third drive gear (10) to/from the carrier (C); and a fourth clutch (C4) for bringing the sun gear (S) and the ring gear (R) into engagement/disengagement with each other.

8 Claims, 9 Drawing Sheets

*Fig. 2*

| Range | C 1 | C 2 | C 3 | C 4 | B 1 | B 2 | Ratio(examples) |
|---|---|---|---|---|---|---|---|
| L o w |   |   | ◯ |   | ◯ |   | 14.028 |
| 2 n d | ◯ |   | ◯ |   |   |   | 8.592 |
| 3 r d |   | ◯ | ◯ |   |   |   | 6.435 |
| 4 t h |   |   | ◯ | ◯ |   |   | 4.196 |
| 5 t h |   | ◯ |   | ◯ |   |   | 3.241 |
| 6 t h | ◯ |   |   | ◯ |   |   | 2.320 |
| R e v |   | ◯ |   |   |   | ◯ | 7.593 |

*Fig. 9*

|     | C1 | C3 | C4 | B1 | B2 |
|-----|----|----|----|----|----|
| Low |    | ○  |    | ○  |    |
| 2nd | ○  | ○  |    |    |    |
| 3nd |    | ○  | ○  |    |    |
| 4th | ○  |    | ○  |    |    |
| Rvs | ○  |    |    |    | ○  |

AUTOMATIC TRANSMISSION

FIELD OF THE INVENTION

The present invention relates to an automatic transmission that combines a planetary gear train to a parallel shaft type automatic transmission.

BACKGROUND OF THE INVENTION

There are demands for automobiles that have high fuel efficiencies because of environmental concerns. Accordingly, improvements for fuel economy have been made on automatic transmissions which are incorporated in automobiles. For example, speed ranges are arranged with multiple speed change ratios to transmit efficiently the output of the engine to wheels of the vehicle.

As a method for designing an automatic transmission with multiple speed change ratios, for example, an automatic transmission is equipped with a planetary gear train whose gears are used in combination for establishing speed change ratios. Also, as another example, an automatic transmission incorporates a plurality of gear trains that are disposed on a plurality of shafts arranged in parallel with one another (refer to, for example, Japanese Laid-Open Patent Publication No. S60(1985)-4651 (pages 3 and 4 and FIG. 1)).

However, the provision of multiple speed change ratios to an automatic transmission involves an increase in the number of gear intermeshing and also an increase in the number of elements that generate dragging torques, like clutches or brakes. These increases present another problem that an automatic transmission designed in such a way can experience an impairment in the efficiency of power transmission. It is possible to improve the transmission efficiency by designing a parallel shaft gear train type automatic transmission to have the least number of gear intermeshing. In this case, however, a plurality of gear trains are required in the same number as the speed ranges to be endowed to the power transmission. Therefore, this leads to an enlargement of the automatic transmission and impairs the mountability of the automatic transmission, for example, on an automobile. On the other hand, if an automatic transmission is designed with a planetary gear train, then it is possible to compact the total size of the transmission. However, the relatively large number of intermeshings inside the automatic transmission acts to increase the resistance in the power transmission and thereby decreases the efficiency of the power transmission.

SUMMARY OF THE INVENTION

To solve these problems, it is an object of the present invention to provide an automatic transmission that combines a planetary gear train to a parallel shaft type automatic transmission and that achieves high degrees of fuel efficiency and of compactness.

According to the present invention, an automatic transmission comprises a planetary gear train, an output shaft (for example, the countershaft 5 described in the following embodiment), which is disposed in parallel with the rotational axis of the planetary gear train, ring gear braking means (for example the first brake B1 described in the following embodiment), a ring-driving gear train (for example, the first gear train G1 described in the following embodiment), clutching means for the ring-driving gear train (for example, the first clutch C1 described in the following embodiment), a carrier-driving gear train (for example, the third gear train G3 described in the following embodiment), clutching means for the carrier-driving gear train (for example, the third clutch C3 described in the following embodiment), and clutching means for the planetary gear train (for example, the fourth clutch C4 described in the following embodiment). Furthermore, the planetary gear train comprises a sun gear element, which is connected to an input shaft (for example, the first main shaft 3 described in the following embodiment), a carrier element and a ring gear element. The ring-driving gear train comprises a ring-drive gear (for example, the first drive gear 6 described in the following embodiment), which is connected to the ring gear element, and a ring-driven gear (for example, the first driven gear 7 described in the following embodiment), which is disposed rotatably over the output shaft and meshes with the ring-drive gear. The carrier-driving gear train comprises a carrier-drive gear (for example, the third drive gear 10 described in the following embodiment), which is disposed rotatably and coaxially to the carrier element, and a carrier-driven gear (for example, the third driven gear 11 described in the following embodiment), which is connected to the output shaft and meshes with the carrier-drive gear. In this automatic transmission, the ring gear braking means can hold the ring gear element stationary, and the clutching means for the ring-driving gear train engages or disengages the ring-driven gear to or from the output shaft. The clutching means for the carrier-driving gear train engages or disengages the carrier-drive gear to or from the carrier element, and the clutching means for the planetary gear train brings the sun gear element and the ring gear element into engagement with each other or into disengagement.

This construction enables the automatic transmission to operate by the planetary gear train in the lower speed ranges where the transmission efficiency has little contribution to the fuel economy of the vehicle and to operate only by the gear trains disposed over the parallel shafts (i.e., the rotational shaft of the planetary gear train and the output shaft) in the higher speed ranges where the transmission efficiency has a greater contribution to the fuel economy. Therefore, this construction provides a compact automatic transmission that has a high transmission efficiency.

In this automatic transmission, it is preferable that the ring-driving gear train comprise two sets of gear trains (for example, the first gear train G1 and the second gear train G2 described in the following embodiment), which are disposed in parallel with each other, and that the clutching means for the ring-driving gear train comprise two clutching means (for example, the first clutch C1 and the second clutch C2 described in the following embodiment), each engaging or disengaging a corresponding one of the two ring-driven gears (for example, the first driven gear 7 and the second driven gear 9 described in the following embodiment) to or from the output shaft.

This construction enables the automatic transmission to have six forward speed ranges. This increase in the number of speed ranges leads to a further improvement in the fuel economy.

It is preferable that the automatic transmission further comprise carrier-braking means (for example, the second brake B2 described in the following embodiment), which can hold the carrier element stationary.

This construction enables the automatic transmission to acquire a reverse range by the utilization of the planetary gear train. This factor can contribute to the compactness of the automatic transmission.

In this automatic transmission, it is preferable that the is ring gear braking means comprise a one-way brake. In this case, the one-way brake prevents, from rotating, the ring gear element that has a tendency to rotate in the direction opposite to that of the sun gear element, thereby keeping the ring gear element stationary.

Furthermore, it is preferable that the carrier-braking means comprise a one-way brake with a neutral function. In this case, this one-way brake is switchable between a free condition where the carrier element is allowed to rotate freely and a locked condition where the carrier element, which tends to rotate in the same direction as the sun gear element, is prevented from rotating, and as a result, kept stationary.

These arrangements reduce the dragging torques generated in the ring gear braking means and in the carrier-braking means, respectively, and lead to a further improvement in the transmission efficiency.

Preferably, the above automatic transmission can also comprise a reverse gear train and forward/reverse switching clutch means (for example, the dogteeth clutch CH described in the following embodiment). In this case, the carrier-driven gear is disposed rotatably over the output shaft, and the reverse gear train comprises a reverse drive gear (for example, the reverse drive gear 16 described in the following embodiment), which is coupled with the carrier-drive gear, a reverse driven gear (for example, the reverse driven gear 17 described in the following embodiment), which is disposed rotatably over the output shaft, and an idle gear (for example, the reverse idle gear 18 described in the following embodiment), which meshes with the reverse drive gear and with the reverse driven gear. The forward/reverse switching clutch means engages either the carrier-driven gear or the reverse driven gear to the output shaft.

This arrangement also reduces the dragging torque generated in the carrier-braking means, and the provision of the reverse gear train enables the reduction ratio of the reverse range to be determined without any restraint.

BRIEF DESCRIPTION OF THE DRAWINGS

FIG. 2 is a table showing relations between speed ranges and clutches and brakes actuated in the automatic transmission.

FIG. 6A is a first example of gear train arrangement while FIG. 6B is a second example of gear train arrangement.

FIG. 9 is a table, showing relations between speed ranges and clutches and brakes actuated in the automatic transmission, which can establish four speed change ratios for a forward drive.

DESCRIPTION OF THE PREFERRED EMBODIMENTS

Figure 1:
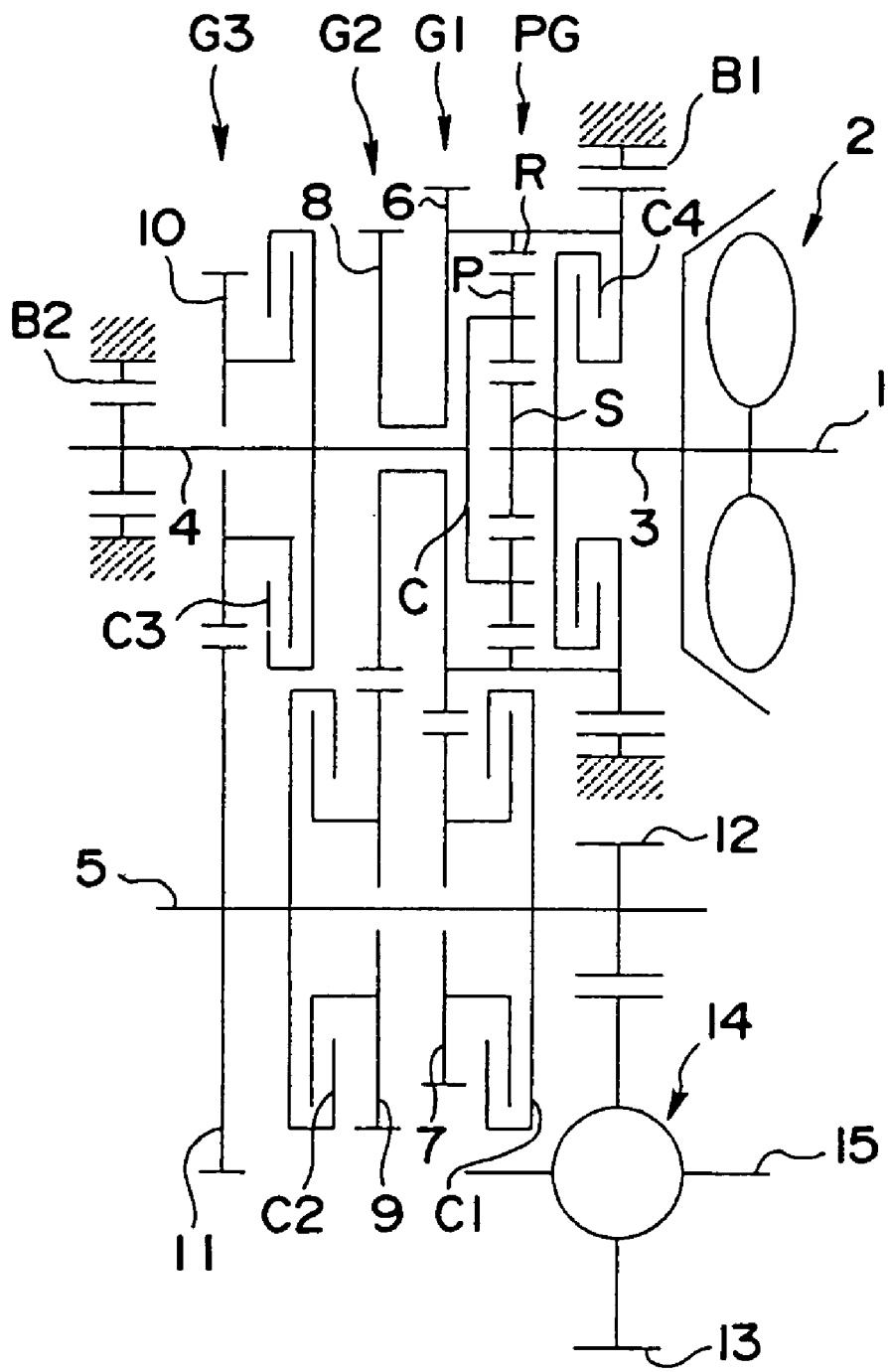
FIG. 1 is a skeleton diagram showing the construction of an automatic transmission according to the present invention.

Now, a preferred embodiment of the present invention is described in reference to the drawings. As shown in FIG. 1, an automatic transmission according to the present invention comprises a planetary gear train PG, a countershaft 5, which is disposed in parallel with the rotational axis (first and second main shafts 3 and 4 described below) of the planetary gear train PG, three gear trains G1~G3, and six frictionally engaging means (brakes B1 and B2 and clutches C1~C4).

The planetary gear train PG comprises a sun gear S, a pinion P, a carrier C and a ring gear R. The sun gear S is connected to a first main shaft 3, which is the input shaft of the transmission positioned at the rotational center of the planetary gear train, and the pinion P meshes with the sun gear S and rotates around its own axis and circles around the sun gear. The carrier C retains the pinion rotatably, and they together circle around the sun gear S. The ring gear R has internal gear teeth and meshes with the pinion P, and the ring gear R is rotatable around the axis of the sun gear S. In other words, the planetary gear train PG is of a single pinion type. The first main shaft 3 is connected through a torque converter 2 to the output shaft 1 of an engine.

The ring gear R is provided with a first brake B1, which can hold and fix the ring gear R. Also, at the rotational axis of the carrier C, connected is a second main shaft 4, which is aligned coaxially with the first main shaft 3. Over the second main shaft 4 and the countershaft 5, provided are first~third gear trains G1~G3.

The first gear train G1 comprises a first drive gear 6, which is disposed rotatably around the second main shaft 4, and a first driven gear 7, which is disposed rotatably around the countershaft 5 and meshes with this first drive gear 6. The first drive gear 6 is coupled with the ring gear R so that they can rotate together as a unified body. On the other hand, the first driven gear 7 is held to or released from the countershaft 5 by a first clutch C1, which is provided on the countershaft 5.

The second gear train G2 comprises a second drive gear 8, which is disposed rotatably around the second main shaft 4, and a second driven gear 9, which is disposed rotatably around the countershaft 5 and meshes with this second drive gear 8. The second drive gear 8 is coupled with the first drive gear 6 so that they can rotate together with the ring gear R as a unified body. On the other hand, the second driven gear 9 is held to or released from the countershaft 5 by a second clutch C2, which is provided on the countershaft 5.

The third gear train G3 comprises a third drive gear 10, which is disposed rotatably around the second main shaft 4, and a third driven gear 11, which is disposed rotatably around the countershaft 5 and meshes with this third drive gear 10. In the third gear train G3, the third drive gear 10 is held to or released from the second main shaft 4 by a third clutch C3, which is provided on the second main shaft 4.

These gear trains G1~G3 are designed to have reduction ratios in a descending order from the end of the transmission on the second main shaft side toward the other end.

The second main shaft 4 is provided with a second brake B2, which is actuated to hold and fix the carrier C, which is connected to the second main shaft 4. In the planetary gear train PG, a fourth clutch C4 is provided between the sun gear S and the ring gear R, so that the sun gear S and the ring gear R are held together or released from each other by the fourth clutch C4.

In this automatic transmission, the first brake B1, the fourth clutch C4, the planetary gear train PG, the first gear train G1, the second gear train G2, the third clutch C3, the third gear train G3 and the second brake B2 are positioned on the first and second main shafts 3 and 4 in this order from the side of the torque converter 2. On the other hand, the first and second clutches C1 and C2 on the countershaft 5 are positioned to sandwich the first and second gear trains G1 and G2, which are disposed together with the third gear train G3 in the above described order.

In this automatic transmission, the engagement and disengagement of the first~fourth clutches C1~C4 and the first and second brakes B1 and B2 are controlled in combination to engage and disengage the planetary gear train PG and the first~third gear trains G1~G3 for establishing respective speed ranges. Thereby, the rotational speed of the first main shaft 3 is transmitted to the countershaft 5 at the speed change ratio so established currently.

The shift control of the automatic transmission according to the present invention achieves six forward speed ranges (Low, 1st, 2nd, 3rd, 4th, 5th and 6th) and one reverse speed range (Rev) by controlling specifically the engagement and disengagement of the clutches and the brakes as shown in FIG. 2. In the table shown in FIG. 2, "○" represents the engaged state of that specific clutch (C1~C4) or brake (B1 and B2) marked with it. The reduction ratio of each speed range is determined from the numbers of teeth of the gears that establish the respective speed range. For reference, FIG. 2 shows ratios as examples.

It is clear from the table that each speed range of the six forward speed ranges is established by engaging two of the clutches C1~C4 and brakes B1~B2, which elements are hereinafter referred also as engaging means. It is also clear that the shift from one speed range to a next upper or lower speed range is executed by releasing one of the two engaging means that have been in engagement and bringing another engaging means into engagement, instead. This way of shifting is called "sequential shifting". Sequential shifting method makes the shift control of the transmission relatively simple.

Figure 3:
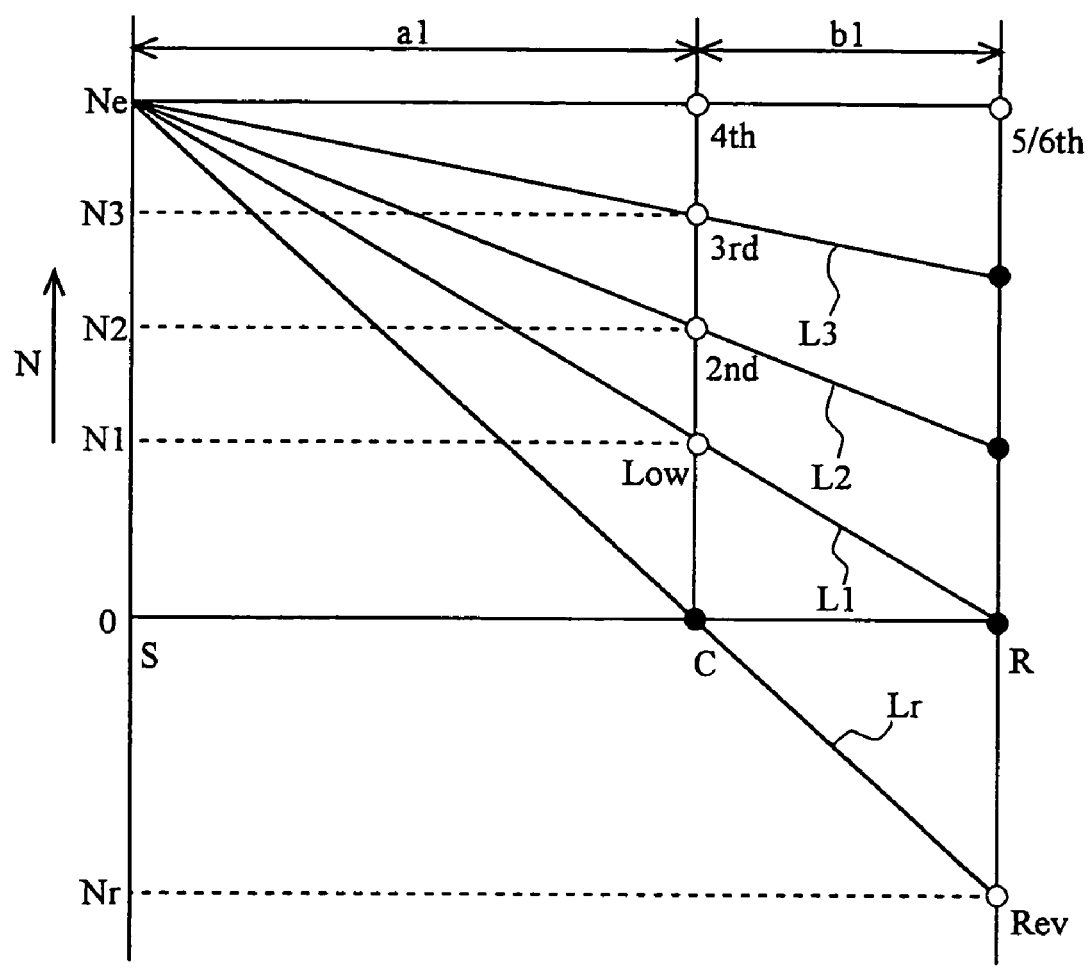
FIG. 3 is a velocity line diagram showing rotational relations among the elements of the planetary gear train of the automatic transmission.

FIG. 3 is a line diagram showing relations in rotational speed among the elements of the planetary gear train PG of the automatic transmission. Referring to this diagram, the reduction ratio of each speed range is described below.

FIG. 3 is a velocity line diagram describing the sun gear S, the carrier C and the ring gear R of the planetary gear train PG. In this diagram, the vertical lines represent these rotational elements (sun gear S, carrier C and ring gear R), and the length of each vertical line corresponds to the rotational speed N of the element represented by the respective vertical line. The distances between the vertical lines are proportional to the reciprocals of the numbers of teeth provided on the sun gear S and ring gear R, respectively.

In FIG. 3, the three vertical lines represent, from the left side, the sun gear S, the carrier C and the ring gear R. The distance a1 between the vertical line representing the sun gear S and that representing the carrier C corresponds to the reciprocal ($=1/Z_s$) of the number of teeth $Z_s$ provided on the sun gear S, while the distance b1 between the vertical line representing the carrier C and that representing the ring gear R corresponds to the reciprocal ($=1/Z_r$) of the number of teeth $Z_r$ provided on the ring gear R.

While the sun gear S is rotating at rotational speed Ne, if the ring gear R is held stationary by the first brake B1 (i.e., the rotational speed of the ring gear R is 0), then the carrier C rotates at rotational speed N1, which is indicated by the intersection of the vertical line representing the carrier C and line L1 connecting the two points that represent the current condition of the sun gear and the ring gear, respectively.

Now, each speed range of the automatic transmission according to the present invention is described in reference to FIG. 3. For the Low range, the first brake B1 and the third clutch C3 are engaged. As a result, the ring gear R is held stationary, the sun gear S rotates at the rotational speed Ne of the engine, and the carrier C rotates at rotational speed N1 as described above. Because the carrier C is connected through the second main shaft 4 and the third clutch C3 to the third gear train G3, the countershaft 5 rotates at the rotational speed that is determined by the reduction ratio of the third gear train G3. Therefore, the reduction ratio of the Low range is determined by the product of the reduction ratio (=Ne/N1) of the planetary gear train PG and that of the third gear train G3.

For the 2nd range, the first brake B1, which has been engaged for the Low range, is released, and instead, the first clutch C1 is engaged. In this condition, the rotation of the countershaft 5 is transmitted through the first clutch C1 to the first gear train G1. As a result, the ring gear R rotates in the same direction as the sun gear S (this condition is referred to as "torque split mode"). In this condition, the rotational speed of the ring gear R is lower than that of the sun gear S because of the reduction by the first gear train G1 and the third gear train G3. As shown in FIG. 3, the carrier C rotates at rotational speed N2, which is the intersection of the vertical line representing the carrier C and line L2 connecting the two points that represent the rotational speeds of the sun gear S and ring gear R. Therefore, the reduction ratio of the 2nd range is determined by the product of the reduction ratio (=Ne/N2) of the planetary gear train PG and that of the third gear train G3.

For the 3rd range, the first clutch C1, which has been engaged for the 2nd range, is released, and instead, the second clutch C2 is engaged. In this condition, the rotation of the countershaft 5 is transmitted through the second clutch C2 to the second gear train G2. As a result, the ring gear R rotates in the same direction as the sun gear S in a torque split mode. Because the reduction ratio of the second gear train G2 is designed larger than that of the first gear train G1 as described above, the rotational speed of the ring gear R is higher than that in the 2nd range. As shown in FIG. 3, the carrier C rotates at rotational speed N3, which is the intersection of the vertical line representing the carrier C and line L3 connecting the two points that represent the rotational speeds of the sun gear S and ring gear R. Therefore, the reduction ratio of the 3rd range is determined by the product of the reduction ratio (=Ne/N3) of the planetary gear train PG and that of the third gear train G3.

For the 4th range, the second clutch C2, which has been engaged for the 3rd range, is released, and instead, the fourth clutch C4 is engaged. In this condition, the sun gear S and the ring gear R, which are combined by the fourth clutch C4, rotate as a unified body, so the pinion P is fixed between the sun gear S and the ring gear R and moves with them as a unified body. As a result, the rotational speed of the carrier C (second main shaft 4) is the same as that of the first main shaft 3. In other words, the output of the torque converter 2 is transmitted directly to the second main shaft 4. This rotation of the second main shaft 4 is transmitted through the third gear train G3 to the countershaft 5. Therefore, the reduction ratio of the 4th range is the reduction ratio of the third gear train G3.

For the 5th range, the third clutch C3, which has been engaged for the 4th range, is released, and instead, the second clutch C2 is engaged. In this condition, the rotation of the ring gear R is transmitted through the second gear train G2 to the countershaft 5. Therefore, the reduction ratio of the 5th range is the reduction ratio of the second gear train G2.

For the 6th range, the second clutch C2, which has been is engaged for the 5th range, is released, and instead, the first clutch C1 is engaged. In this condition, the rotation of the ring gear R is transmitted through the first gear train G1 to the countershaft 5. Therefore, the reduction ratio of the 6th range is the reduction ratio of the first gear train G1.

For the Rev range, the second brake B2 and the second clutch C2 are engaged. Because the second main shaft 4 is held stationary by the second brake B2, the carrier C is also held stationary. In this condition, as shown in FIG. 3, the rotational speed Nr of the ring gear R is determined as the intersection of the vertical line representing the ring gear R and line Lr connecting the two points that represent the rotational speeds of the sun gear S and carrier C. This rotational speed is a negative value, which means that the rotational direction of the ring gear R is opposite to that of the input rotation. This rotation is transmitted through the second gear train G2 to the countershaft 5.

Figure 4:
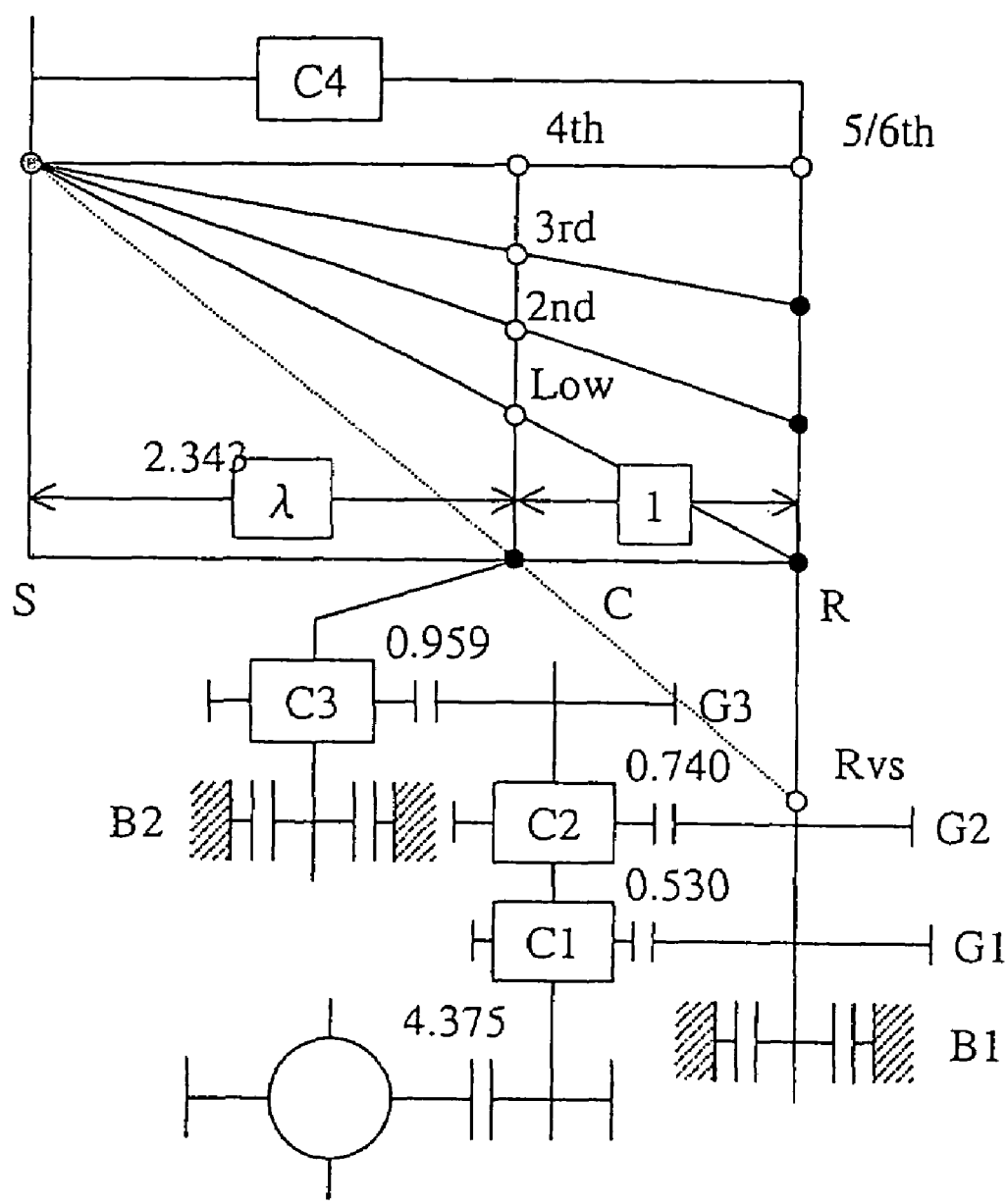
FIG. 4 is a diagram showing clutches and brakes in relation to the velocity line diagram.

FIG. 4 shows the elements of the automatic transmission in relation to the velocity line diagram. The values inscribed in the diagram are examples for the reduction ratios of the respective gear trains. These values correspond with the reduction ratios of the respective speed ranges listed in FIG. 2.

The rotation of the countershaft 5, whose rotational speed is changed in the above described way, is then transmitted through a counter gear 12 provided on the countershaft 5 and through a final gear 13, which meshes with the counter gear 12, to a differential mechanism 14. This rotation is output to axle shafts 15 to drive wheels of the vehicle.

As described above, the automatic transmission according to the present invention is designed in a compact form to use the planetary gear train PG and the parallel shaft type gear trains G1~G3 for power transmission (with speed ratio change) in the lower speed ranges (Low range~3rd range) where low transmission efficiency of the automatic transmission has little effect on the fuel economy of the vehicle. In addition, the automatic transmission is so designed that only the parallel shaft type gear trains G1~G3 are used, with only one gear-intermeshing for each speed range, for power transmission (with speed ratio change) in the higher speed ranges (4th range~6th range) where transmission efficiency has a significant effect on the fuel economy. In this way, the transmission efficiency of the automatic transmission is made relatively high to improve the fuel economy.

By constructing an automatic transmission with a combination of parallel shaft type gear trains and a planetary gear train in such a way, the increase in the number of engaging elements is minimized, and the differential rotation of each engaging element is made lower than the rotational speed Ne of the engine. This construction is advantageous on the problem of friction such as dragging torque. Also, because the planetary gear train is utilized to realize a Rev range, no additional gear train is required as a reverse gear train. This factor contributes to the compactness of the automatic transmission.

In the above described embodiment, the output of the torque converter 2 to the planetary gear train PG is input to the sun gear S, and the output from the planetary gear train is output from the carrier C (or the ring gear R). This is to secure sufficient differences among the speed change ratios for the rotations taken out from the carrier C at the lower speed ranges because the reduction ratios of the lower speed ranges of the automatic transmission according to the present invention are determined by the reduction ratios of the planetary gear train PG as described above. If the automatic transmission were designed to receive the input by the ring gear R and to output from the carrier C, then the differences among the speed change ratios taken out from the carrier C would be smaller, and the lower speed ranges would have close ratios.

Also, in the above described embodiment, the first and second clutches C1 and C2, which correspond to the first and second gear trains G1 and G2, respectively, are provided on the countershaft 5. This arrangement makes it possible that the planetary gear train PG and the first clutch C1 be positioned approximately in a common plane and that the second clutch C2 and the third clutch C3 be positioned approximately in a common plane. This is advantageous in compacting the length of the automatic transmission. Furthermore, as shown in FIG. 4, the reduction ratios of the first and second gear trains G1 and G2 are in overdrive if they are viewed from the point of the first main shaft 3. Therefore, by providing the first and second clutches C1 and C2 on the countershaft 5, the clutching capacities of these clutches are made smaller than otherwise (however, if the reduction ratio between the counter gear 12 and the final gear 13 is extremely large, then there is a case where these clutching capacities can be relatively large).

In the above embodiment, a brake (first brake B1) comprising frictionally engaging means is used to hold the ring gear R stationary. In the case where the brake comprises frictionally engaging means, even while the brake is not in engagement, a little dragging is generated in the brake. This dragging torque results in a torque loss in the power transmission, reducing the efficiency of the automatic transmission. Therefore, by constructing the first brake from a one-way brake (one-way clutch), the dragging torques generated in the 2nd~6th ranges are reduced to achieve a high transmission efficiency.

In this case, the one-way brake (B1) is disposed to prevent the ring gear R from rotating in the direction opposite to the rotational direction of the sun gear S. More specifically, while the sun gear S rotates, the rotation of the sun gear is transmitted through the pinion to the ring gear R. As a result, the ring gear R tends to rotate in the direction opposite to that of the sun gear S. Therefore, by preventing the rotation of the ring gear R with the one-way brake, the ring gear R is held stationary. While the automatic transmission is set in the speed ranges other than the Low range, the ring gear R rotates in the same direction as the sun gear S. In this case, the rotation is not restricted by the one-way brake (B1).

By using a one-way brake for the first brake B1, the shift between the Low range and the 2nd range, which involves a large difference in speed change ratio, is executed only by the engagement or disengagement of the first clutch C1 (without the disengagement of the first brake B1). This factor contributes an improvement to the controllability of the automatic transmission.

Also, by using a one-way brake for the second brake B2, is which is to hold the carrier C stationary, the dragging torque generated in the second brake B2 is reduced to achieve an improvement in the transmission efficiency. As a result, the fuel efficiency is improved in the speed ranges from the Low range to the 6th range. In this case, it is preferable that this one-way brake comprise a one-way clutch with a neutral function whose free (neutral) condition and locked condition are switchable to allow the carrier C (second main shaft 4) to rotate freely in the free condition and to prevent the carrier C from rotating at least in the same direction as the sun gear S in the locked condition. As such a one-way clutch with a neutral function, PC (WO) 2002-504979 discloses a clutch that comprises a spring strut and a slide plate. In this clutch, the slide plate is controlled to engage and disengage the strut for switching the clutch between its free condition and locked condition.

Figure 5:
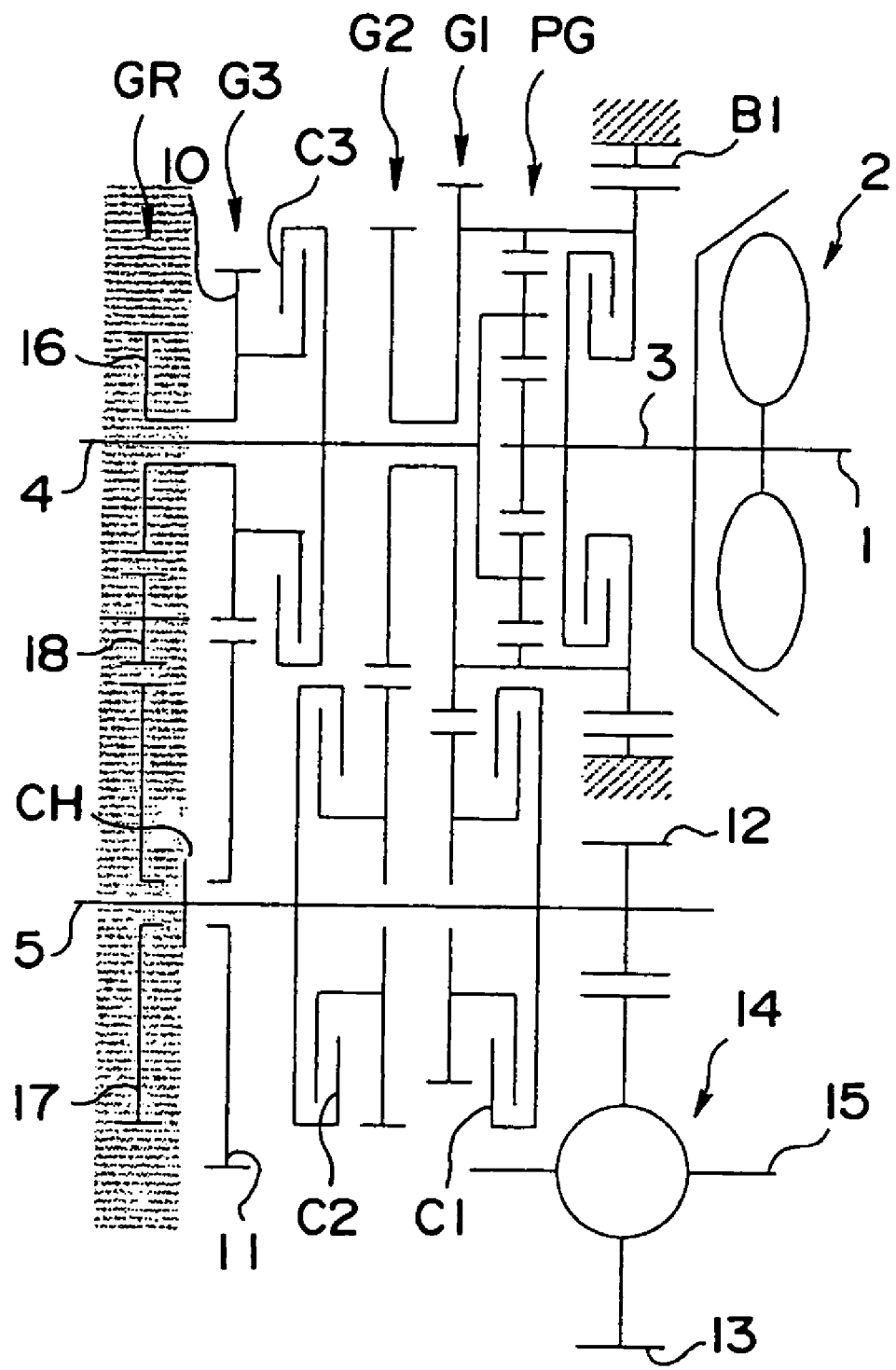
FIG. 5 is a skeleton diagram showing the construction of an automatic transmission that incorporates a reverse gear train.

As a method to eliminate the dragging torque of the second brake B2, instead of the second brake B2, a reverse gear train GR can be incorporated in the automatic transmission as shown in FIG. 5. In the figure, the components identical with those shown in FIG. 1 are given the same numbers, respectively, to leave out the description of the identical components in the following explanation.

The reverse gear train GR comprises a reverse drive gear 16, a reverse driven gear 17 and a reverse idle gear 18. The reverse drive gear 16 is disposed rotatably over the second main shaft 4 and coupled with the third drive gear 10 of the third gear train G3, so that the third drive gear 10 and the reverse drive gear 16 rotate together as a unified body. The reverse driven gear 17 is disposed rotatably over the countershaft 5, and the reverse idle gear 18 meshes with both the reverse drive gear 16 and the reverse driven gear 17. In this case, the third driven gear 11 is also disposed rotatably over the countershaft 5. Furthermore, a dogteeth clutch CH is provided between the third driven gear 11 and the reverse driven gear 17 to engage and disengage either one of the gears.

With this construction, when the automatic transmission is set into any of the speed ranges from the Low range to the 6th range, the third driven gear 11 is brought into engagement to the countershaft 5 by controlling the mode of the dogteeth clutch CH. On the other hand, when the automatic transmission is set into the Rev range, the reverse driven gear 17 is brought into engagement to the countershaft 5 by controlling appropriately the mode of the dogteeth clutch CH. Thereby, the shifts among the forward speed ranges are controlled in the same way as the above described embodiment. However, this embodiment can achieve a higher transmission efficiency for the Low~6th ranges because the second brake B2, which generates a dragging torque in the prior embodiment, is eliminated. In addition, this embodiment enables the reduction ratio of the reverse gear train to determine the reduction ratio of the Rev range, providing the same degree of freedom for the determination of the reduction ratio of the Rev range as in the case for a gear train in a parallel shaft type automatic transmission.

In an automatic transmission according to the present invention, the arrangement of the engaging means and the gear trains including the planetary gear train PG is not limited to the above described arrangement. These members may also be arranged as shown in FIG. 6. In the arrangement shown in FIG. 6, the main shaft is constructed as a one-piece shaft, but the engaging means, the engagement control and the connection among the rotational members like gear trains are the same as the embodiment shown in FIG. 1.

Figure 6A:
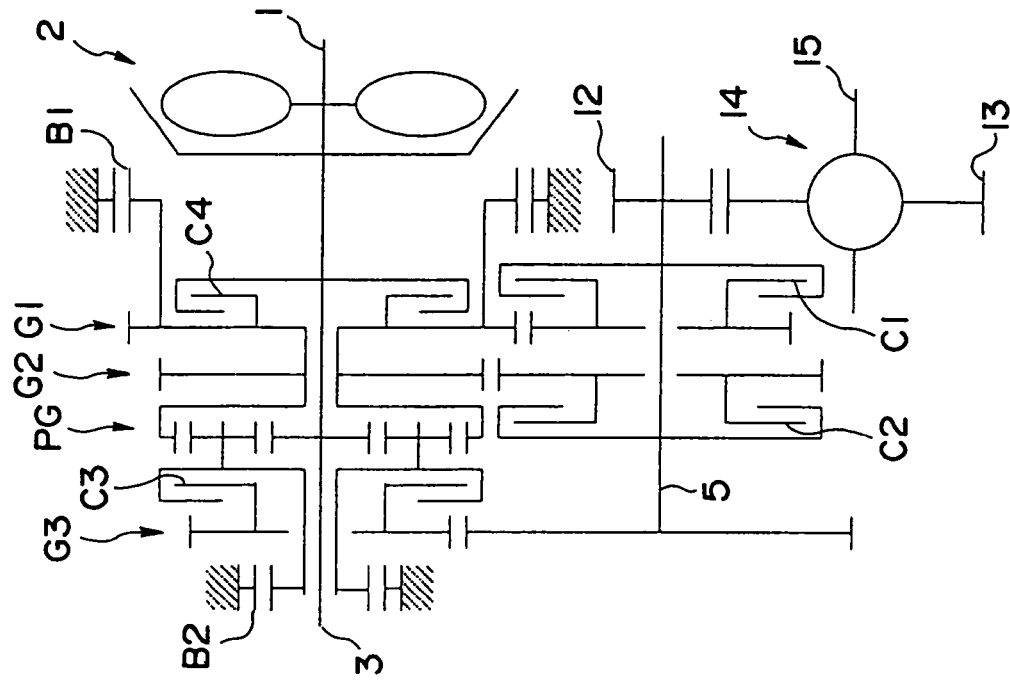
FIGS. 6A and 6B are skeleton diagrams showing examples that have different arrangements of gear trains.

In a first arrangement shown in FIG. 6A, the positional order of the members is reversed from that of the arrangement shown in FIG. 1, with the second brake B2, the third gear train G3, the third clutch C3, the second gear train G2, the first gear train G1, the planetary gear train PG, the first brake B1 and the fourth clutch C4 being aligned in this order from the side of the torque converter 2. The first clutch C1 and the second clutch C2 are disposed on the countershaft 5 to sandwich the first gear train G1 and the second gear train G2 as the embodiment shown in FIG. 1.

Figure 6B:
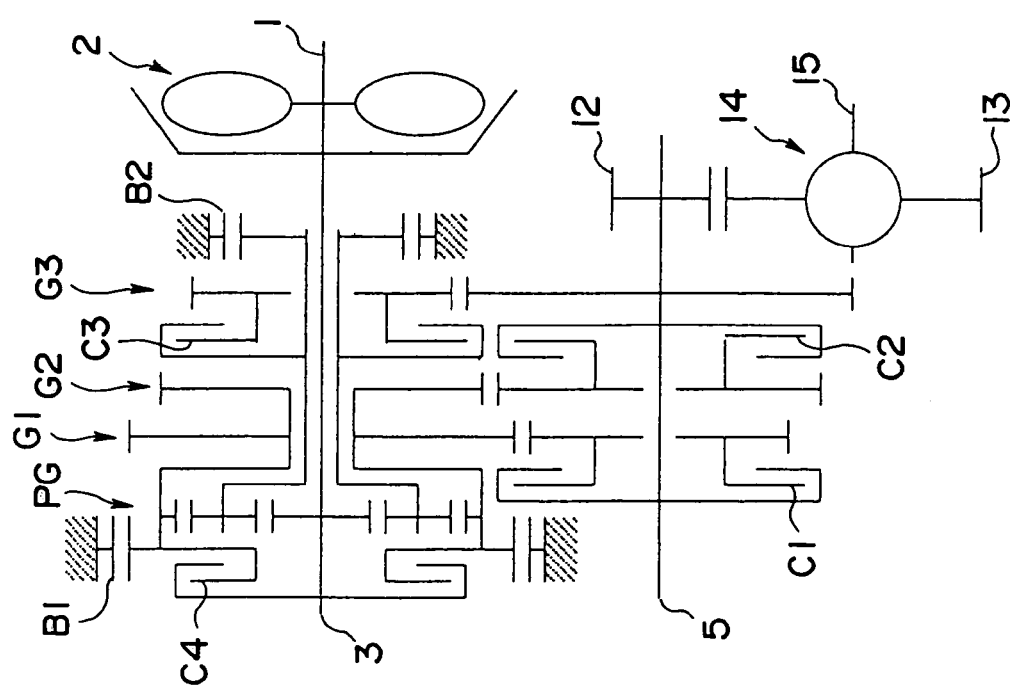

In a second arrangement shown in FIG. 6B, the members are positioned in the following order from the side of the torque converter 2: the first brake B1, the fourth clutch C4, the first gear train G1, the second gear train G2, the planetary gear train PG, the third clutch C3, the third gear train G3 and the second brake B2. In this case, also, the first clutch C1 and the second clutch C2 are disposed on the countershaft 5 to sandwich the first gear train G1 and the second gear train G2.

In correspondence to the sizes of the gears used in the automatic transmission or the forms of the vehicles incorporating the automatic transmission, the members of the automatic transmission can be rearranged as shown in these drawings.

Figure 7:
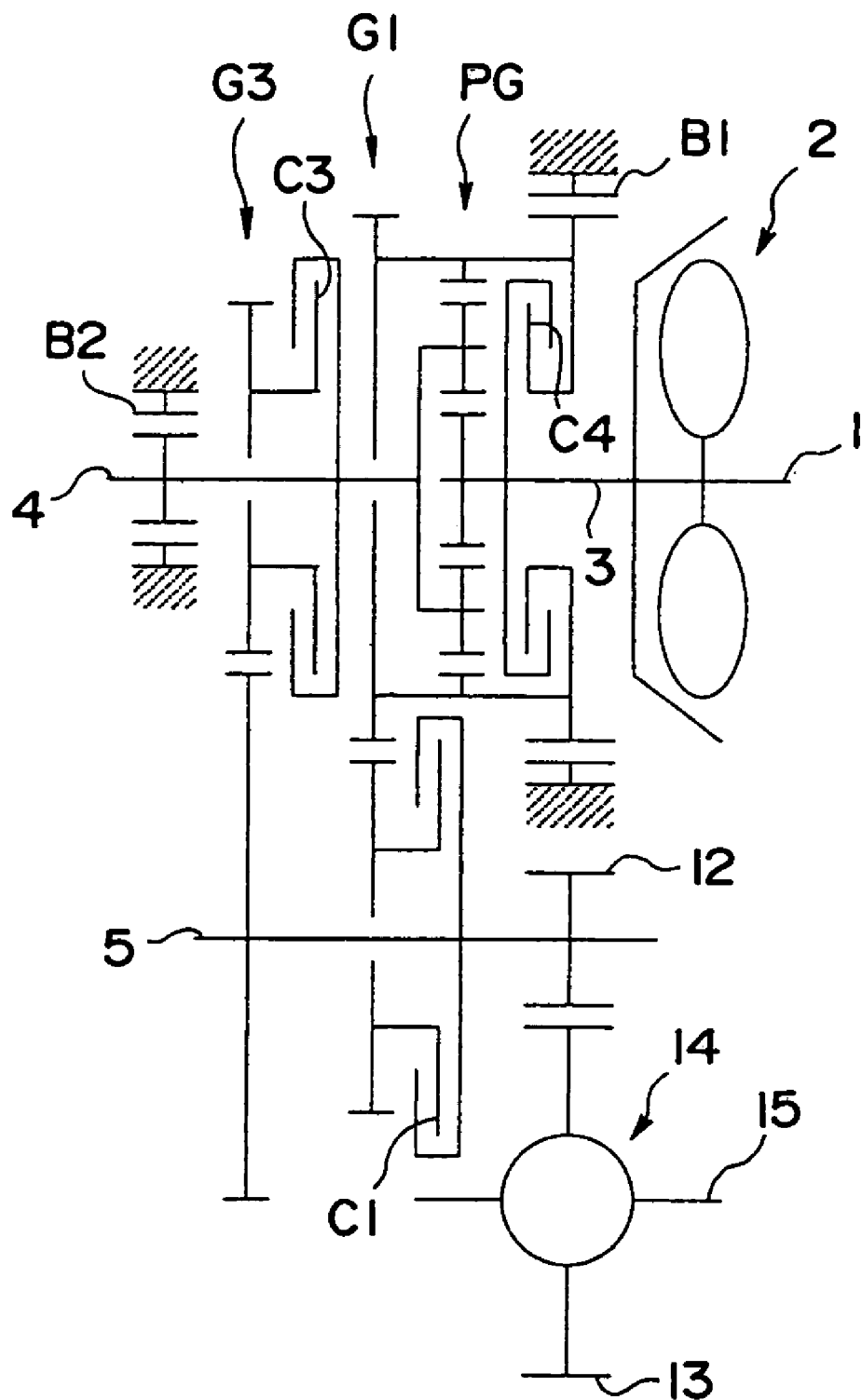
FIG. 7 is a skeleton diagram showing an automatic transmission that can establish four speed change ratios for a forward drive.
Figure 8:
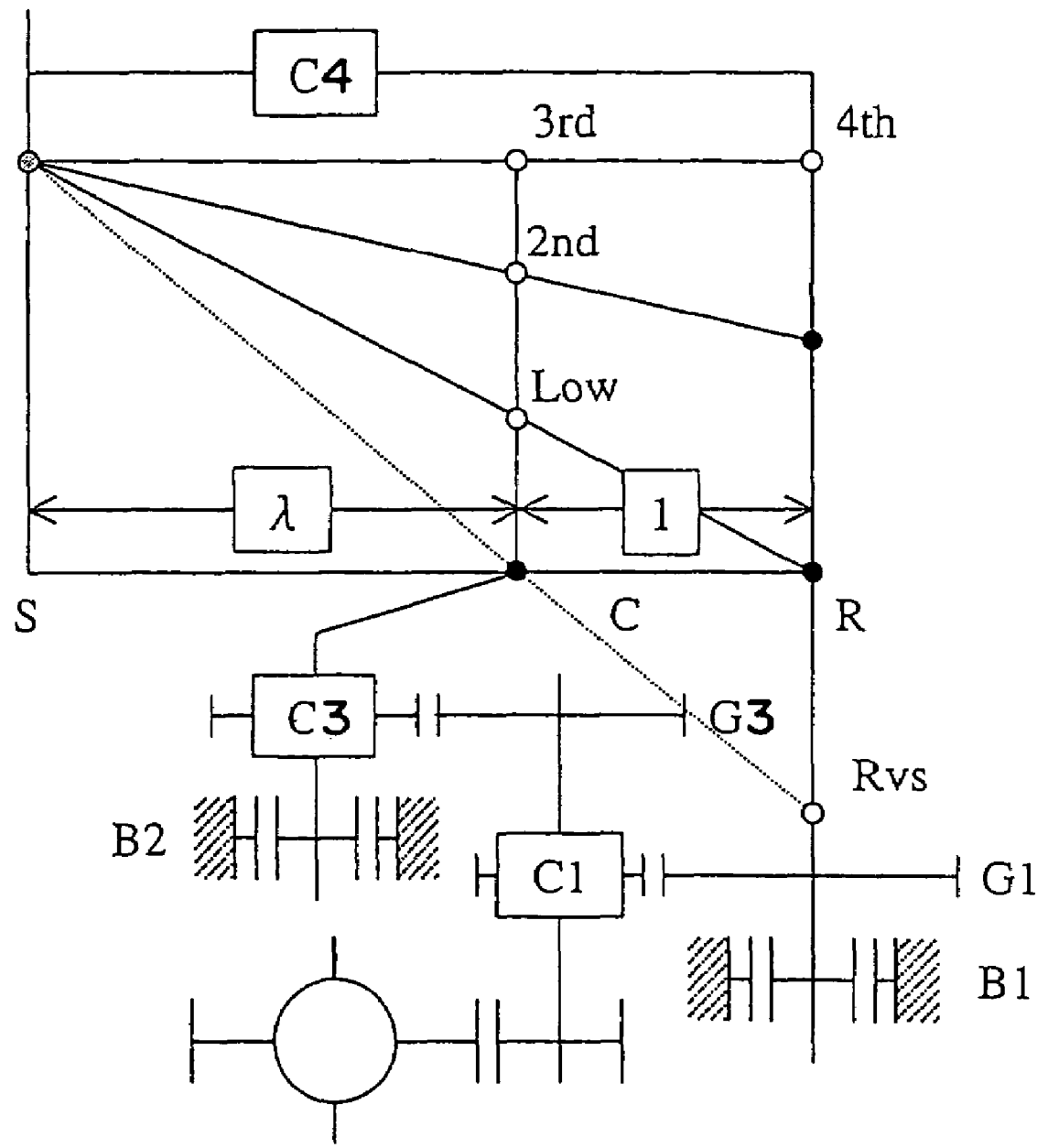
FIG. 8 is a velocity line diagram describing the automatic transmission, which can establish four speed change ratios for a forward drive.
Figure 9:
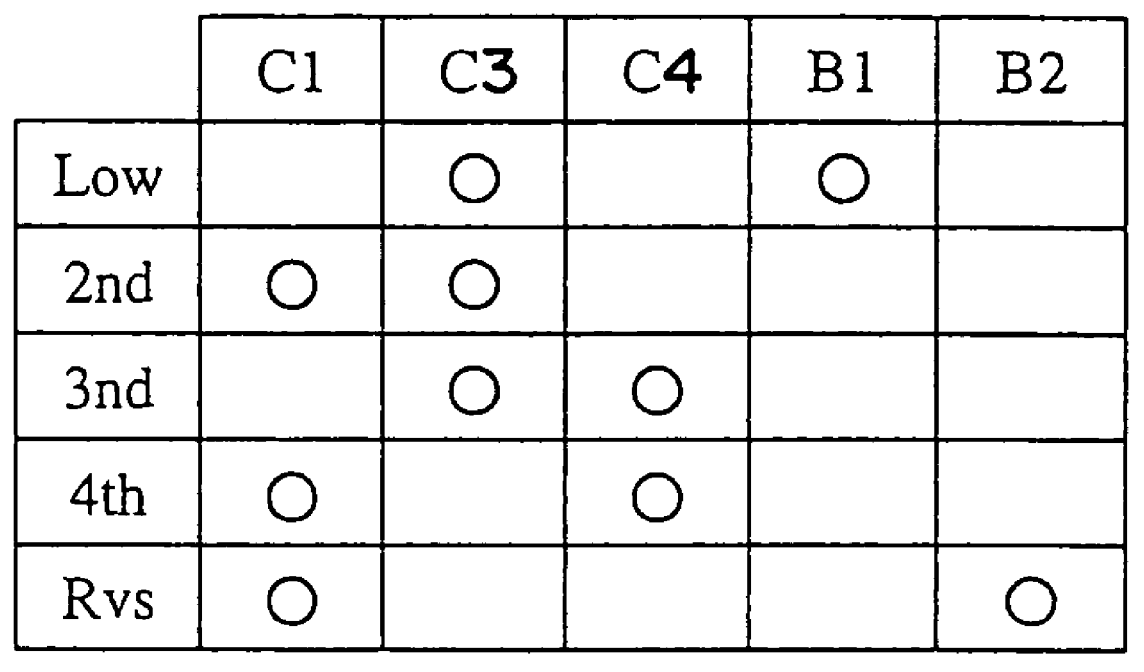

In each above described arrangement, the two gear trains, the first gear train G1 and the second gear train G2, are driven by the ring gear R of the planetary gear train PG. This enables the automatic transmission to have six forward speed ranges and one reverse range. However, by limiting the gear trains driven by the ring gear R to only one set as shown in FIG. 7, the automatic transmission is arranged to have four forward speed ranges and one reverse range (in FIG. 7, the members identical with those shown in FIG. 1 are given the same numbers to leave out redundant explanation). A velocity line diagram describing the automatic transmission, which has four forward speed ranges, is shown in FIG. 8, and a table describing the shift control of this automatic transmission is shown in FIG. 9. This automatic transmission also achieves a high transmission efficiency and a high compactness because it also combines a parallel shaft type automatic transmission with a planetary gear train. In the same way as the above embodiments, the engaging means of this automatic transmission can be controlled in a sequential manner, so the shift control is simple.

It is clear from the above description that the combination of a parallel shaft type automatic transmission with a planetary gear train according to the present invention achieves an automatic transmission that is compact and highly fuel-efficient. This combination enables the automatic transmission to operate by the planetary gear train in the lower speed ranges where the transmission efficiency has little contribution to the fuel economy and to operate only by the gear trains disposed over the parallel shafts in the higher speed ranges where the transmission efficiency has a greater contribution to the fuel economy. Furthermore, the automatic transmission according to the present invention enables easy rearrangement, in which the number of gear trains driven by the ring gear element is increased just by addition, resulting in an increase in the number of speed ranges. This is a further improvement in fuel economy.

In addition, the planetary gear train is utilized also to realize a reverse range. This factor contributes to the compactness of the automatic transmission.

For a further improvement in transmission efficiency, one-way brakes can be applied as braking means, and a reverse gear train instead of braking means may be applied to realize the reverse range.

What is claimed is:

1. An automatic transmission comprising:
   a planetary gear train, which comprises a sun gear element, a carrier element and a ring gear element, said sun gear element being connected to an input shaft;
   an output shaft being disposed in parallel with a rotational axis of said planetary gear train;
   ring gear braking means capable of holding said ring gear element stationary;

a ring-driving gear train comprising a ring-drive gear, which is connected to said ring gear element, and a ring-driven gear, which is disposed rotatably over said output shaft and meshes with said ring-drive gear;

clutching means for said ring-driving gear train, which means engages or disengages said ring-driven gear to or from said output shaft;

a carrier-driving gear train comprising a carrier-drive gear, which is disposed rotatably and coaxially to said carrier element, and a carrier-driven gear, which is connected to said output shaft and meshes with said carrier-drive gear;

clutching means for said carrier-driving gear train, which means engages or disengages said carrier-drive gear to or from said carrier element; and clutching means for said planetary gear train, which means brings said sun gear element and said ring gear element into engagement with each other or into disengagement.

2. The automatic transmission as set forth in claim 1, wherein said planetary gear train is of a single pinion planetary gear.

3. The automatic transmission as set forth in claim 1 or 2, wherein:

said ring-driving gear train comprises two sets of gear trains, which are disposed in parallel with each other; and said clutching means for said ring-driving gear train comprises two clutching means, each of which engages or disengages a corresponding one of the ring-driven gear and another ring-driven gear to or from said output shaft.

4. The automatic transmission as set forth in claim 1 or 2, wherein:

a second input shaft is provided coaxially with said input shaft; and said ring-drive gear and said carrier-drive gear, respectively, are disposed rotatably over said second input shaft.

5. The automatic transmission as set forth in claim 1 or 2, further comprising carrier-braking means, which can hold said carrier element stationary.

6. The automatic transmission as set forth in claim 5, wherein:

a second input shaft is provided coaxially with said input shaft;

said ring-drive gear and said carrier-drive gear, respectively, are disposed rotatably over said second input shaft;

said carrier-braking means is provided on said second input shaft; and said carrier element is held stationary through said second input shaft by actuation of said carrier-braking means.

7. The automatic transmission as set forth in claim 1 or 2, wherein:

said ring gear braking means comprises a one-way brake, which prevents rotation of said ring gear element that has a tendency to rotate in a direction opposite to that of said sun gear element, thereby keeping said ring gear element stationary.

8. The automatic transmission as set forth in claim 5, wherein:

said carrier-braking means comprises a one-way brake with a neutral function, which brake is switchable between a free condition where said carrier element is allowed to rotate freely and a locked condition where said carrier element, which tends to rotate in a rotational direction of said sun gear element, is prevented from rotating, and as a result, kept stationary.

* * * * *